United States Patent
Pell

(10) Patent No.: US 11,750,680 B2
(45) Date of Patent: Sep. 5, 2023

(54) SYSTEMS AND METHODS TO SELECTIVELY COMBINE VIDEO STREAMS

(71) Applicant: Meta Platforms, Inc., Menlo Park, CA (US)

(72) Inventor: Oliver Pell, London (GB)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/909,437

(22) Filed: Jun. 23, 2020

(65) Prior Publication Data
US 2020/0322295 A1 Oct. 8, 2020

Related U.S. Application Data

(63) Continuation of application No. 14/981,840, filed on Dec. 28, 2015, now Pat. No. 10,728,194.

(51) Int. Cl.
| | |
|---|---|
| *H04L 67/01* | (2022.01) |
| *H04L 67/104* | (2022.01) |
| *H04L 51/046* | (2022.01) |
| *H04L 67/02* | (2022.01) |
| *H04L 12/18* | (2006.01) |
| *H04L 51/52* | (2022.01) |

(Continued)

(52) U.S. Cl.
CPC .......... *H04L 67/01* (2022.05); *H04L 12/1813* (2013.01); *H04L 12/1827* (2013.01); *H04L 51/046* (2013.01); *H04L 51/52* (2022.05); *H04L 65/75* (2022.05); *H04L 67/02* (2013.01); *H04L 67/104* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 6,520,864 B1 * | 2/2003 | Wilk | A63B 24/0006 |
| | | | 473/152 |
| 9,307,001 B2 | 4/2016 | Chougle et al. | |
| 9,342,752 B1 | 5/2016 | Lee et al. | |

(Continued)

*Primary Examiner* — Lance Leonard Barry

(74) *Attorney, Agent, or Firm* — Sheppard Mullin Richter & Hampton LLP

(57) ABSTRACT

Systems, methods, and non-transitory computer readable media are configured for determining that a first peer involved in a video conference is a primary peer; determining that a second peer involved in the video conference is a secondary peer in response to non-satisfaction by the second peer of a threshold associated with a selected number of objects in the second peer; determining a viewing peer involved in the video conference, wherein the primary peer, the secondary peer, and the viewing peer are different; creating a modified video stream of the second peer in response to the determining that the second peer is the secondary peer based on the non-satisfaction by the second peer of the threshold associated with the selected number of objects in the second peer; detecting a static area and a dynamic area in a video stream of the first peer; superimposing the modified video stream of the second peer onto the static area in the video stream of the first peer; and providing a composite video including the video stream of the first peer, the modified video stream of the second peer, and a video stream of the viewing peer for presentation to the viewing peer.

19 Claims, 12 Drawing Sheets

(51) Int. Cl.
*H04L 65/75* (2022.01)
*H04L 51/10* (2022.01)

(56) References Cited

U.S. PATENT DOCUMENTS

| | | | |
|---|---|---|---|
| 10,331,976 B2* | 6/2019 | Akata | G06V 10/464 |
| 2003/0020803 A1* | 1/2003 | Yang | H04N 7/15 |
| | | | 348/E7.083 |
| 2005/0036359 A1* | 2/2005 | Egan | G06Q 30/08 |
| | | | 348/E7.071 |
| 2006/0015904 A1* | 1/2006 | Marcus | H04N 7/16 |
| | | | 348/E7.071 |
| 2006/0026628 A1* | 2/2006 | Wan | H04N 5/2723 |
| | | | 375/240.26 |
| 2009/0207233 A1* | 8/2009 | Mauchly | H04N 7/15 |
| | | | 348/14.09 |
| 2010/0149305 A1* | 6/2010 | Catchpole | G06V 40/172 |
| | | | 348/E7.083 |
| 2010/0302446 A1* | 12/2010 | Mauchly | H04N 21/4788 |
| | | | 348/14.08 |
| 2012/0054691 A1 | 3/2012 | Nurmi | |
| 2012/0127262 A1* | 5/2012 | Wu | H04N 7/152 |
| | | | 348/14.09 |
| 2012/0229625 A1 | 9/2012 | Calman et al. | |
| 2013/0072221 A1* | 3/2013 | Chen | H04W 4/14 |
| | | | 345/629 |
| 2014/0179439 A1 | 6/2014 | Miura et al. | |
| 2014/0223123 A1* | 8/2014 | Goodman | G06F 11/0751 |
| | | | 711/162 |
| 2014/0267569 A1 | 9/2014 | Periyannan et al. | |
| 2014/0317532 A1 | 10/2014 | Ma et al. | |
| 2015/0281698 A1* | 10/2015 | Zhao | H04N 19/23 |
| | | | 375/240.02 |
| 2015/0312521 A1* | 10/2015 | Bright-Thomas | H04N 7/152 |
| | | | 348/14.09 |
| 2015/0334313 A1 | 11/2015 | Chougle et al. | |
| 2016/0210998 A1 | 7/2016 | Leske | |
| 2016/0343351 A1* | 11/2016 | Chen | G09G 5/005 |
| 2017/0091540 A1* | 3/2017 | Wu | G06V 40/103 |
| 2017/0187657 A1* | 6/2017 | Pell | H04L 67/104 |

* cited by examiner

500

```
┌─────────────────────────────────────────────────────────────────────┐
│ Determine a first peer involved in a video communication is a primary peer │
│           based on satisfaction of a threshold                      │
│                              502                                    │
└─────────────────────────────────────────────────────────────────────┘
                                  │
                                  ▼
┌─────────────────────────────────────────────────────────────────────┐
│ Determine a second peer involved in the video communication is a secondary │
│           peer based on non-satisfaction of the threshold           │
│                              504                                    │
└─────────────────────────────────────────────────────────────────────┘
                                  │
                                  ▼
┌─────────────────────────────────────────────────────────────────────┐
│ Determine a modified video stream of the second peer is to be superimposed │
│      onto a video stream of the first peer to create a composite video     │
│                              506                                    │
└─────────────────────────────────────────────────────────────────────┘
```

FIGURE 5

SYSTEMS AND METHODS TO SELECTIVELY COMBINE VIDEO STREAMS

CROSS-REFERENCE TO RELATED APPLICATIONS

This application is a continuation of U.S. patent application Ser. No. 14/981,840, filed Dec. 28, 2015 and entitled "SYSTEMS AND METHODS TO SELECTIVELY COMBINE VIDEO STREAMS", which is incorporated herein by reference.

FIELD OF THE INVENTION

The present technology relates to the field of video communications. More particularly, the present technology relates to techniques for optimizing video communications involving multiple users.

BACKGROUND

Today, people often utilize computing devices for a wide variety of purposes. Users can use their computing devices, for example, to communicate and otherwise interact with other users. Such interactions are increasingly popular over a social network.

Interactions in a social network may involve various types of communication. Some types of communication supported by a social networking system allows a user to engage in focused exchanges. For example, the user may target a particular user or users through the use of a messaging system or an email system supported by the social networking system. As another example, the user can enter into audio communications or video communications supported by the social networking system with another user.

In many instances, video communications can be preferred by users because video communications can allow the users to most effectively convey information and simulate real life communications. In some instances, two participants in different locations can engage in video communications. It also can be desirable to allow a group of users in multiple locations to use video communications to facilitate communications among the group.

SUMMARY

Various embodiments of the present technology can include systems, methods, and non-transitory computer readable media configured to receive a video stream of a first peer involved in a video communication. A video stream of a second peer involved in the video communication is received. Image content of the video stream of the second peer is modified to create a modified video stream of the second peer. The video stream of the first peer and the modified video stream of the second peer are combined to create a composite video.

In an embodiment, combining the video stream includes superimposing the modified video stream of the second peer onto the video stream of the first peer.

In an embodiment, modifying image content of the video stream of the second peer includes changing a display shape of the video stream of the second peer.

In an embodiment, modifying image content of the video stream of the second peer includes removing at least a portion of the image content reflected by the video stream of the second peer.

In an embodiment, the at least a portion of the image content includes at least one of background, foreground, and objects other than a user of the second peer.

In an embodiment, the modifying image content of the video stream of the second peer includes resizing a user depicted in the video stream of the second peer to be within a threshold difference value from a user depicted in the video stream of the first peer.

In an embodiment, a video stream of a viewing peer involved in the video communication is received. The composite video is presented to the viewing peer. The composite video excludes the video stream of the viewing peer.

In an embodiment, the first peer is a conference room in which a plurality of users are participating in the video communication.

In an embodiment, the second peer is a location at which a user is positioned while participating in the video communication.

In an embodiment, the computing system includes a client computing device.

In addition, various embodiments of the present technology can include systems, methods, and non-transitory computer readable media configured to determine that a first peer involved in a video communication is a primary peer based on satisfaction of a threshold. It is determined that a second peer involved in the video communication is a secondary peer based on non-satisfaction of the threshold. It is determined that a modified video stream of the second peer is to be superimposed onto a video stream of the first peer to create a composite video.

In an embodiment, the threshold is a selected number of users in a peer.

In an embodiment, the first peer has a plurality of users and the second peer has a single user.

In an embodiment, a static area in the video stream of the first peer is detected. The modified video stream of the second peer is superimposed onto the static area in the video stream of the first peer.

In an embodiment, it is determined that the static area fails to satisfy a materiality threshold.

In an embodiment, the first peer has a plurality of users and the second peer has a single user, the method further comprising:

In an embodiment, affinity between the single user of the second peer and each user of the plurality of users of the first peer is determined. The modified video stream of the second peer is superimposed onto the video stream of the first peer at a location adjacent to a user of the plurality of users having a greatest affinity with the single user of the second peer.

In an embodiment, the second peer has a single user. A location associated with the first peer is determined. A location associated with the single user is determined. The modified video stream of the second peer is superimposed onto the video stream of the first peer based on a difference in location between the first peer and the single user satisfying a distance threshold.

In an embodiment, it is determined that a third peer involved in the video communication is a primary peer based on satisfaction of the threshold. The video stream of the first peer is positioned adjacent to a video stream of the third peer in the composite video.

In an embodiment, the threshold is an absence of a user in a peer. It is determined that a third peer involved in the video communication is a secondary peer based on non-satisfaction of the threshold. The modified video stream of the second peer and a video stream of the third peer are superimposed onto the video stream of the first peer.

In an embodiment, an input by a user of viewing peer to change a location of the modified video stream of the second peer in the composite video is received. The location of the modified video stream of the second peer in the composite video is changed in response to the input.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates a second method for creating a composite video, according to an embodiment of the present technology.

Figure 1:
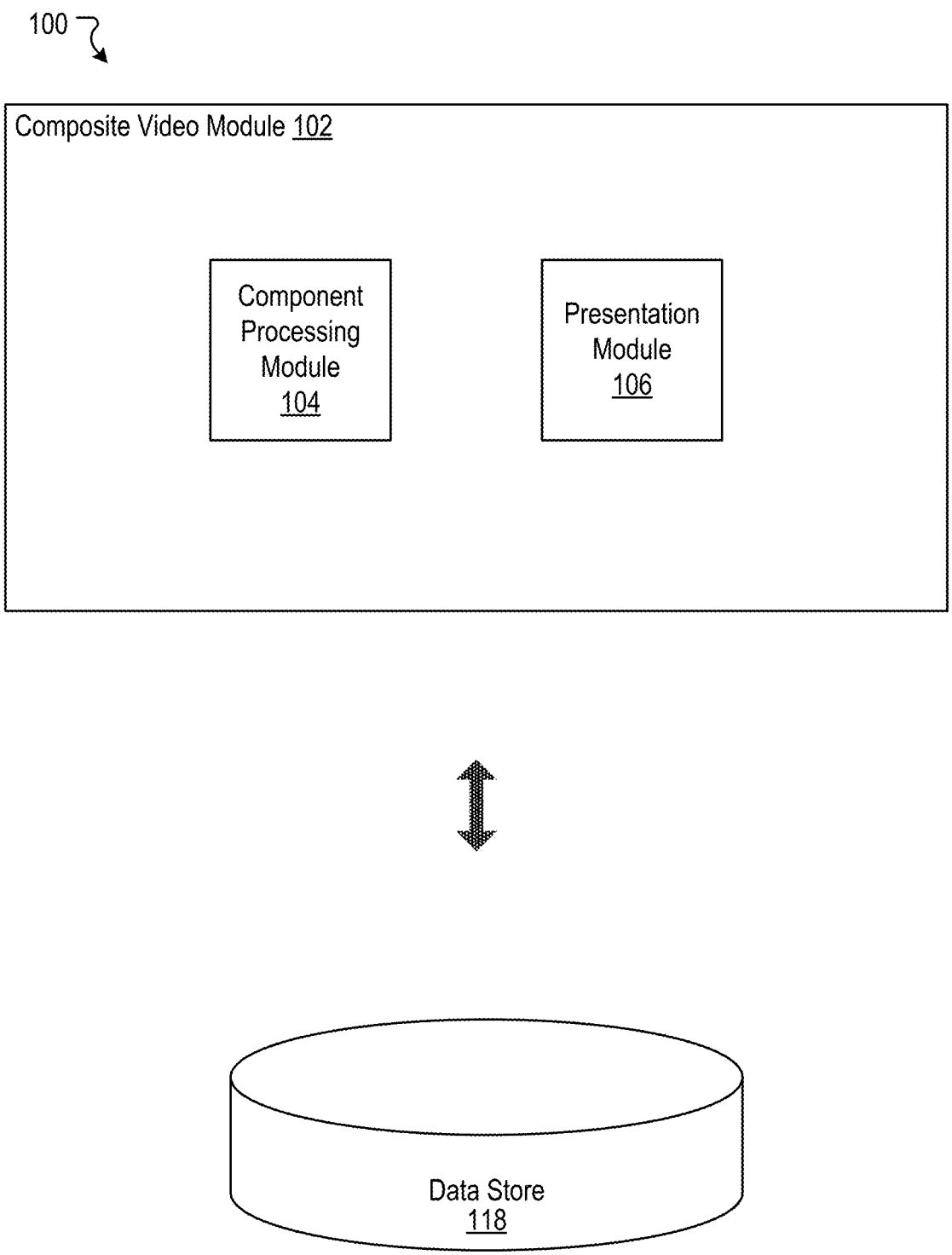
FIG. 1 illustrates a system including an example composite video module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Compositing Video

Interactions in a social network may involve various types of communication. Some types of communication supported by a social networking system allows a user to engage in focused exchanges. For example, the user may target a particular user or users through the use of a messaging system or an email system supported by the social networking system. As another example, the user can enter into audio communications or video communications supported by the social networking system with another user.

In many instances, video communications can be preferred by users because video communications can allow the users to most effectively convey information and simulate real life communications. In some instances, two participants in different locations can engage in video communications. It also can be desirable to allow a group of users in multiple locations to use video communications to facilitate communications among the group. When video communications involve a group of users in different locations, conventional techniques in some examples can involve co-equal presentation of each location in the group in a single video view. Such presentation can fail to optimize the limited area of the video view. In other examples, conventional techniques can present or highlight in the video view a selected number of last users or their locations who spoke to the group. This approach can be disadvantageous because it does not allow for continuous view of all users, including users who have not spoken recently or at all.

An improved approach rooted in computer technology to allow compositing of video overcomes these and other disadvantages associated with conventional approaches implemented in computer technology. Systems, methods, and computer readable media of the present technology can determine peers participating in a video communication. Each video stream associated with a peer is analyzed to determine, for example, the presence of users and the presence of static locations in the video stream. For a peer having only one user, image content of a video stream of the peer can be modified. For example, when an original video stream of the peer has a rectangular shape, the video stream can be modified to have an oval or circular shape. As another example, the video stream can be modified in view size so that the user is approximately the same size as other users depicted in video streams of other peers. In some instances, a modified video stream of the peer can be superimposed onto a static area of a video stream of another peer to create a composite video. Contextual data about users associated with the peers can be analyzed to inform where the modified video stream can be superimposed. A composite video can be designed so that each peer participating in the video communication can view a tailored composite video. In some instances, composition of a video can be rules based. During presentation of the composite video to a user associated with a viewing peer, the user can modify a position of a video stream associated with a peer in the composite video. More details regarding the present technology are discussed herein.

FIG. 1 illustrates an example system 100 including an example composite video module 102 configured to allow compositing of separate video streams to create a composite video for each peer in a video communication, according to an embodiment of the present technology. A video communication can include a video event or session (e.g., video conference) in which peers at multiple locations participate through their respective video streams. Each location can correspond to a peer. A peer can include a room (or other gathering) of many users (or participants), a room of one user, a user who is not in a room, or any other gathering or resource that is to participate in a video communication. Each peer can be associated with a video stream that captures in video and audio the activities of users of the peer. The composite video module 102 can include a component processing module 104 and a presentation module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the composite video module 102 can be implemented in any suitable combinations.

The component processing module 104 can determine peers involved in a video communication. The video stream of each peer can be analyzed to identify various characteristics of the video stream. Video streams of certain peers can be modified to create modified video streams. A modified video stream of a peer can be superimposed onto a video stream of another peer to enable optimized creation of a composite video that accommodates video streams of all peers. The component processing module 104 is described in more detail herein.

The presentation module 106 can receive contextual data regarding a peer in a video communication, a location associated with the peer, and one or more users associated with the peer. Based on one or more rules, the video streams of the peers involved in the video communication, and the contextual data, a composite video can be generated for each peer. The composite video can be presented to a viewing peer. A user associated with the viewing peer can interact with the presented composite video to vary its presentation. The presentation module 106 is described in more detail herein.

In some embodiments, the composite video module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the composite video module 102 can be, in part or in whole, implemented as software running on one or more computing devices or systems, such as on a server system or a client computing device. In some instances, the composite video module 102 can be, in part or in whole, implemented within or configured to operate in conjunction or be integrated with a social networking system (or service), such as a social networking system 630 of FIG. 6. Likewise, in some instances, the composite video module 102 can be, in part or in whole, implemented within or configured to operate in conjunction or be integrated with a client computing device, such as the user device 610 of FIG. 6. For example, the composite video module 102 can be implemented as or within a dedicated application (e.g., app), a program, or an applet running on a user computing device or client computing system. It should be understood that many variations are possible.

The data store 118 can be configured to store and maintain various types of data, such as the data relating to support of and operation of the composite video module 102. The data maintained by the data store 118 can include, for example, an identification of peers, location information associated with peers, video streams associated with peers, contextual data regarding the peers and users associated with the peers, an image classifier, static objects or areas in video streams, thresholds, composite videos, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the composite video module 102 can be configured to communicate and/or operate with the data store 118. In some embodiments, the data store 118 can be a data store within a client computing device. In some embodiments, the data store 118 can be a data store of a server system in communication with the client computing device.

Figure 2A:
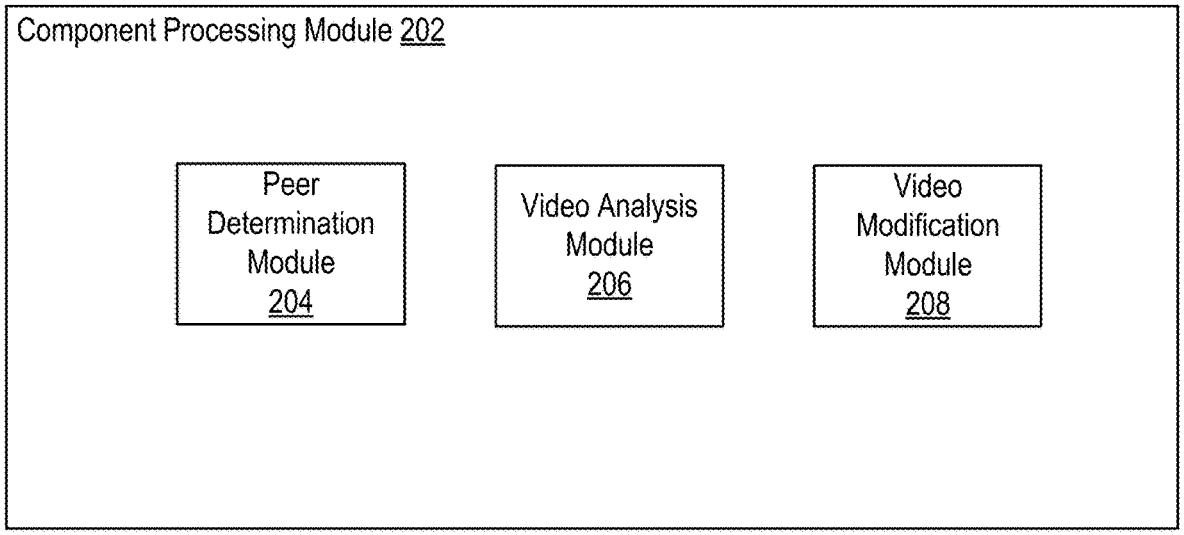
FIG. 2A illustrates an example component processing module, according to an embodiment of the present technology.

FIG. 2A illustrates an example component processing module 202, according to an embodiment of the present technology. In some embodiments, the component processing module 104 of FIG. 1 can be implemented with the component processing module 202. As shown in the example of FIG. 2A, the component processing module 202 can include a peer determination module 204, a video analysis module 206, and a video modification module 208.

The peer determination module 204 can determine peers involved in a video communication. The peer determination module 204 can receive a plurality of video streams associated with peers involved in the video communication. Each video stream can be encoded with data that identifies the peer. For example, the data can indicate a name of the peer (e.g., a room name or room identifier), an IP address of a device associated with the peer that is transmitting the video stream, or any other identifying information that can indicate a peer associated with the video stream. Based on the identifying information, the peer determination module 204 can determine the peers involved in the video communication.

The video analysis module 206 can analyze image data in each video stream associated with a peer involved in a video communication. The video analysis module 206 can implement a classifier that can perform image detection or image recognition on a video stream. One or more frames of the video stream can be periodically or variably provided to the classifier to recognize and identify objects (or concepts) depicted in the video stream. A determination of objects depicted in the video stream can allow for optimal compositing of the video streams, as discussed in more detail herein.

The video analysis module 206 can determine a number of users associated with each peer involved in a video communication. Users can be participants who are present in a room or other location involved in the video communication. One or more frames of a video stream associated with each peer can be provided to the classifier. The classifier can provide a probability or score that the objects reflected in the video stream and recognized by the classifier are persons. A threshold probability or score value can be applied to recognize the objects as persons at a desired confidence level.

In some instances, the video analysis module 206 can not only recognize users but also identify the users. The classifier can identify the users. For example, with respect to a social networking system, the classifier can be trained under a supervised learning technique based on multiple images of users that have been appropriately tagged with identifying information. The identification of users by the video analysis module 206 can facilitate optimal compositing of the video streams, as discussed in more detail herein.

In addition to users, the video analysis module 206 can identify other objects reflected in a video stream. For example, when a peer is a room, the peer can identify the presence of objects in the room, such as tables, chairs, walls, ceilings, credenzas, podiums, etc. As another example, when the peer is an area in which a user is positioned, the peer can identify a background, foreground, objects adjacent to or other than the user, etc.

The video analysis module 206 can determine dynamic objects or areas and static objects or areas reflected in a video stream. Based on the classifier, the video analysis module 206 can identify the objects or areas in a video stream that reflect motion or change as well as the objects or areas of the video stream that do not reflect motion or change. For example, with respect to a peer that is a conference room having a table, the video analysis module 206 can determine that the table in and the walls of the conference room are not moving. As another example, the video analysis module 206 can identify chairs in a conference room and determine whether the chairs reflect motion because, for example, a user is sitting and moving in the chair. Because the video analysis model 206 can periodically or variably perform image analysis on a video stream, the video analysis module 206 also can determine when an object or area has transitioned from a static object or area to a dynamic object or area or from a dynamic object or area to a static object or area. The static nature or dynamic nature of an object or area in relation to time can inform compositing of separate video streams into a composite video. As another example, the video analysis module 206 can identify speaking activity by users associated with a peer.

The video modification module 208 can modify image content reflected in a video stream associated with a peer to allow optimal compositing. In some embodiments, based on a determination that a single user is associated with a peer, the video modification module 208 can modify the video stream associated with the peer for compositing of the video stream with other video streams. For example, the modification can remove (crop out) some or all subject matter in the video stream that does not depict or related to the user. In this example, if the video stream reflects a background, foreground, or other objects apart from the user, some or all of the background, foreground, and the other objects can be removed from the video stream. Removal of image content from the video stream can enhance user experience with the composite video by eliminating distracting subject matter that can detract from a video communication.

The video modification module 208 can change a display shape of the video stream. For example, if the display shape of the video stream is rectangular, the video modification module 208 can change the display share to be oval or circular. In this example, an oval display shape of the video stream can enhance user experience in relation to a video communication when the video stream is superimposed onto a video stream of another peer as part of a composite video. Modifications to achieve other display shapes are possible in other embodiments.

The video modification module 208 can resize the display area of a video stream or depiction of a user in the video stream. The video modification module 208 can support design of a composite video wherein each user across multiple peers is depicted in the composite video having approximately the same size as other users depicted in the composite video or has a different display size in comparison to the other users within a threshold difference value. If a video stream associated with a peer depicts only one user, the video modification module 208 can appropriately resize the video stream so that the depicted user is approximately the same size as the depiction of users in video streams associated with one or more other peers. In this manner, when the video stream depicting only one user is superimposed onto a video stream of another peer to create a composite video, all of the users can be depicted to have approximately the same size. Such size parity can enhance user experience with the composite video. In this manner, modifications by the video modification module 208 to image content in a video stream, such as selective removal of subject matter, a change in display shape, and a change in display size of a video stream or depiction of a user therein, can allow for more seamless superimposition (overlay) of one video stream onto another video stream in creation of a composite video. Furthermore, to fit within the display size of a composite video, the video modification module 208 can resize the display areas of video streams that are to be positioned adjacent to one another in the composite video without modifications to their image content. In addition, the video modification module 208 can modify one or more video streams so that the video streams reflect a common focus on certain physical features of users. For instance, some video streams of users can reflect only the face, the face and shoulders, or other physical features of the users.

In some embodiments, a peer can have two cameras, a first camera showing a wide angle view (e.g., 180 degrees) and a second camera showing a narrow angle view (e.g., less than 180 degrees). In many situations, most users in the peer can be captured by the second camera. However, in some situations, some users in the peer can be captured only by the first camera, such as users sitting at an edge of a room constituting the peer. The video modification module 208 can identify from a video stream associated with the first camera users who are shown in the wide angle view of the first camera only, crop out these users to create modified video streams depicting these users, and superimpose the modified video streams onto a video stream of the second camera. Such superimposition can address an example scenario where some users are sitting at the edge of the room rather than at a conference table in the room and the ability to avoid exclusive use of a camera with a wide angle view that has the effect of making users undesirably smaller.

Figure 2B:
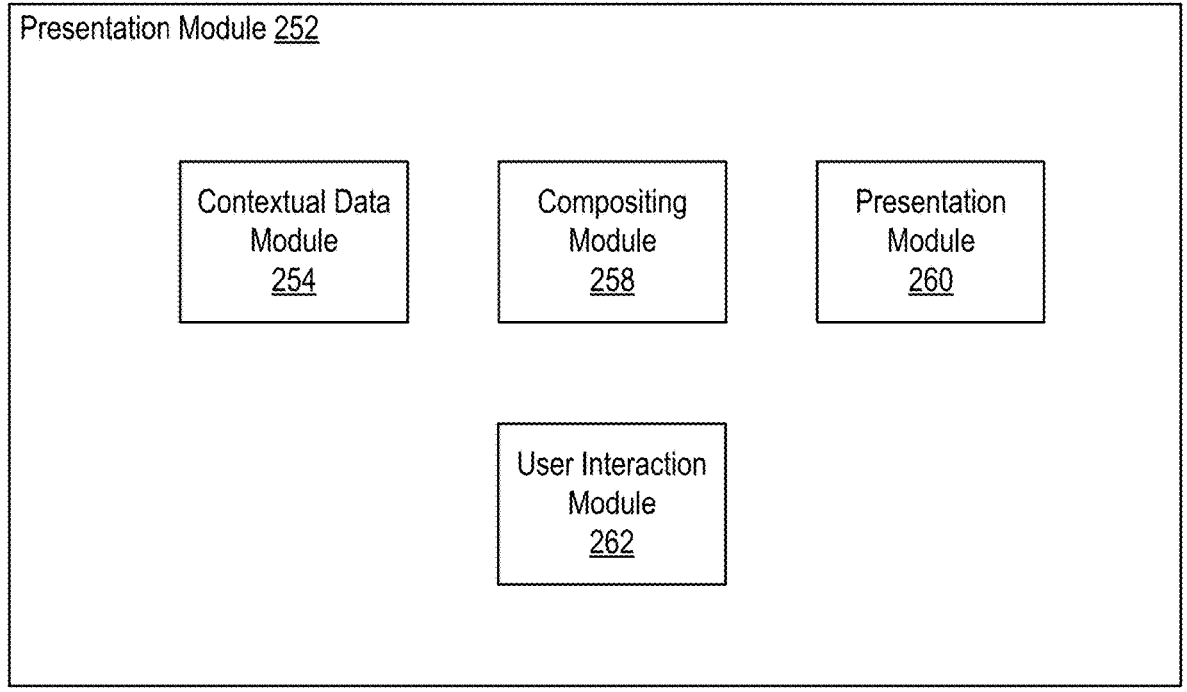
FIG. 2B illustrates a presentation module, according to an embodiment of the present technology.

FIG. 2B illustrates an example presentation module 252 for managing presentation of a composite video for a video communication, according to an embodiment of the present technology. In some embodiments, the presentation module 106 of FIG. 1 can be implemented with the presentation module 252. As shown in the example of FIG. 2, the presentation module 252 can include a contextual data module 254, a compositing module 258, a presentation module 260, and a user interaction module 262.

The contextual data module 254 can receive contextual data about peers involved in the video communication and users associated with the peers. Contextual data regarding a peer can include, for example, a geolocation of the peer, capacity of the peer (e.g., number of seats, user capacity, etc.), communications equipment available in the peer (e.g., a number of video conference screens), etc. Contextual data regarding a user can include, for example, profile information about the user, connections of the user, location of the user, etc. As discussed in more detail herein, the contextual data can inform creation of a composite video and presentation of relevant data for the video communication. In some embodiments, the contextual data can be maintained by a computer system, such as a social networking system, that operates the composite video module 102.

The compositing module 258 can selectively combine video streams associated with peers involved in the video communication to create a composite video. In some embodiments, a composite video can be created and tailored for each viewing peer. In other embodiments, a single composite video can be created for all of the peers.

The compositing module 258 can receive video streams associated with peers involved in the video communication. The compositing module 258 also can receive a video analysis of video streams associated with the peers and any modified video streams that have been created. A composite video can be created by selectively combining and superimposing video streams, including modified video streams. One or more attributes of the video communication can be used by the compositing module 258 to create a composite video. Attributes of the video communication can include, for example, a number of peers involved in a video communication, a viewing peer to which the composite video is to be presented, a number of users reflected in a video stream associated with each peer, identification of objects in each video stream, the static objects or area reflected in a video stream, contextual information about peers and users therein, and other considerations. In embodiments where the composite video is tailored for each viewing peer, the video stream associated with the viewing peer is not included in the composite video and the video streams associated with the other peers are combined to create the composite video.

The compositing module 258 can identify primary peers and secondary peers for the composite video. In an embodiment, a primary peer can be a peer whose associated video stream reflects a threshold number of users that have been identified by video analysis. The threshold number of users can be any selected number of users (e.g., two users, four users, ten users, etc.). If the number of users in a peer satisfies the threshold, then the peer associated with the video stream associated can constitute a primary peer. If the number of users in the peer does not satisfy the threshold, then the peer associated with the video stream can constitute a secondary peer.

The compositing module 258 can combine video streams of primary peers involved in a video communication. In an embodiment, when a video communication includes a plurality of primary peers, video streams of the plurality of primary peers can be combined and positioned in the composite video so that they are adjacent to one another in a suitable layout (e.g., side by side, one above and one below, etc.). For example, a video stream of a first primary peer can be combined with a video stream of a second primary peer without modifications relating to removal of image content from their video streams, superimposition of the video stream of the first primary peer onto the video stream of the second primary peer, or superimposition of the video stream of the second primary peer onto the video stream of the first primary peer.

The compositing module 258 can selectively superimpose video streams associated with secondary peers onto static areas of primary peers. A modified video stream of a secondary peer can be superimposed onto a video stream associated with a primary peer at a position where the video stream associated with the primary peer reflects selected static areas. Selected static areas can include objects or areas reflected in the video stream that constitute objects or areas reflected in the video stream that do not satisfy a materiality threshold. In one embodiment, walls, ceilings, credenzas, background, foreground, or other types of static objects or areas reflected in a video stream associated with a peer can be determined to fail to satisfy a materiality threshold. In an embodiment, a selected static area does not include a desk or table around which users can gather so that no modified video streams are superimposed thereon.

In addition, a modified video stream of a secondary peer can be superimposed onto a video stream associated with a primary peer based on contextual data. In some embodiments, the modified video stream of the secondary peer can be superimposed on a video stream of a primary peer that is most closely connected with the secondary peer. In an embodiment, the modified video stream of the secondary peer having a single user can be superimposed onto the video stream of a primary peer when the geographic distance between the single user and the primary peer satisfies a geographic distance threshold (e.g., is less than or equal to five miles; is less than or equal to ten miles; etc.). In an embodiment, when two or more primary peers are present, the modified video stream of the secondary peer can be superimposed onto the video stream of the primary peer that is closest in geographic distance to the secondary peer. In another embodiment, when two or more primary peers are present, the modified video stream of the secondary peer can be superimposed onto the primary peer that has one or more users with the closest relationship with a user of the secondary peer. For example, assume a first total affinity between a user of a secondary peer and the users of a first primary peer and a second total affinity between the user of the secondary peer and the users of a second primary peer. If the first total affinity is less than the second total affinity, the modified video stream of the secondary peer can be superimposed onto the video stream of the second primary peer instead of the first primary peer. In another embodiment, if a user of a primary peer has a greater affinity with a user of a secondary peer than other users of the primary peer, the modified video stream of the secondary peer can be superimposed at a position in the video stream of the primary peer that closer to that user of the primary peer.

In some embodiments, the compositing module 258 can follow a rules based approach for creating a composite video. In an embodiment, a rules based approach can create a composite video based on, at least in part, attributes of the video communication. In one example of a rules based approach, in the presence of one or more secondary peers and one or more primary peers, modified video streams of secondary peers can be superimposed onto video streams of primary peers so that the each primary peer reflects an equal number of modified video streams of secondary peers, except for a remainder factor. In another example of a rules based approach, in the presence of one or more secondary peers and one or more primary peers, modified video streams of secondary peers can be superimposed onto a video stream of a first primary peer until all selected static objects or areas of the first primary peer are replaced by the modified video streams and, when that occurs, any remaining modified video streams of secondary peers are superimposed onto a second primary peer, and so on. In yet another example of a rules based approach, in the presence of one or more secondary peers and one or more primary peers, a user depicted in a modified video stream of a secondary peer can be positioned closest to one or more users in a video stream of a primary peer having highest affinity with the user depicted in the modified video stream. Many other examples of rules to create composite videos are possible. In some embodiments, a rule can be determined for each unique combination of attributes of the video communication.

In other embodiments, a primary peer of a plurality of peers to be reflected in a composite video can be defined and identified based on an associated video stream reflecting an absence of any user. Other peers of the plurality of peers can constitute secondary peers. In this regard, the compositing module 258 can consider the primary peer as an artificial background that initially includes no one (e.g., empty room, scene, location, etc.) and can superimpose video streams associated with the secondary peers onto the video stream associated with the primary peer. In some cases, as discussed herein, each user in each secondary peer can be extracted from an associated video stream and superimposed onto the video stream associated with the primary peer. In some instances, the users can be depicted as having approximately the same size.

The presentation module 260 can present a composite video to users in the peers involved in the video communication. In an embodiment where a tailored video composite is created for a viewing peer, the presentation module 260 can present the video composite tailored for the viewing peer. The presentation module 260 also can account for a number of screens on which a composite video can be presented for a peer. In an embodiment, the presentation module 260 can segment the composite video to be presented across the number of screens.

The presentation module 260 can superimpose contextual data regarding a composite video or users depicted therein during presentation of the composite video. In an embodiment, the presentation module 260 can display names of users reflected in the composite video and connection status information between users reflected in the composite video. For example, the presentation module 260 can display the degree of connection (e.g., direct connection, second degree connection, etc.) between two users reflected in the composite video or between a user reflected in the composite video and a user of a viewing peer. As another example, when a user is detected as speaking during the video communication, the presentation module 260 can in real time display the name of the user as well as connection status information regarding the user and other users in the composite video. In another embodiment, at or near the conclusion of a video communication, the presentation module 260 can provide a log listing the identities of the users involved in the video communication and the relationships between users. Such a log can provide important highlight or summary information about the video communication.

The user interaction module 262 can enable a user of a viewing peer to dynamically interact with and change the presentation of a composite video. In an embodiment, the user interaction module 262 can componentize in connection with a composite video each video stream of a primary peer and each modified video steam of a secondary peer superimposed onto a video stream of a primary peer. Component video streams can be manipulated by a user to present the component video stream in the composite video in a manner deemed optimal by a viewing peer or a user of the viewing peer. In an embodiment, if a user of a viewing peer desires to modify a location of a modified video stream of a secondary peer superimposed onto a video stream of a primary peer, the user interaction module 262 can allow the user to select the modified video stream and move the location of the modified video stream to a new location in the video stream of the primary peer or the composite video in general. For example, the user interaction module 262 can allow the user to move the modified video stream to a new location within the video stream of the original primary peer in which the modified video stream first appeared or to a new location within a video stream of a different primary peer. In an embodiment, if a user of a viewing peer desires to change the relative location of a video stream of a primary peer in the composite video, the user can move the video stream to a new location in the composite video. In an embodiment, the user interaction module 262 can allow a user through appropriate user inputs to utilize conventional user interface tools and interactions to effect changes to the presentation of the composite video. For example, if the composite video is displayed on a touch screen to a user of a viewing peer, the user can drag and drop (or swipe) video streams to change their location in the composite video. In addition, the user interaction module 262 can allow a user through appropriate user inputs (e.g., a pinch gesture, an expand gesture) to utilize conventional user interface tools and interactions to shrink, enlarge, or otherwise modify various video streams or other portions of the composite video being presented.

Figure 3A:
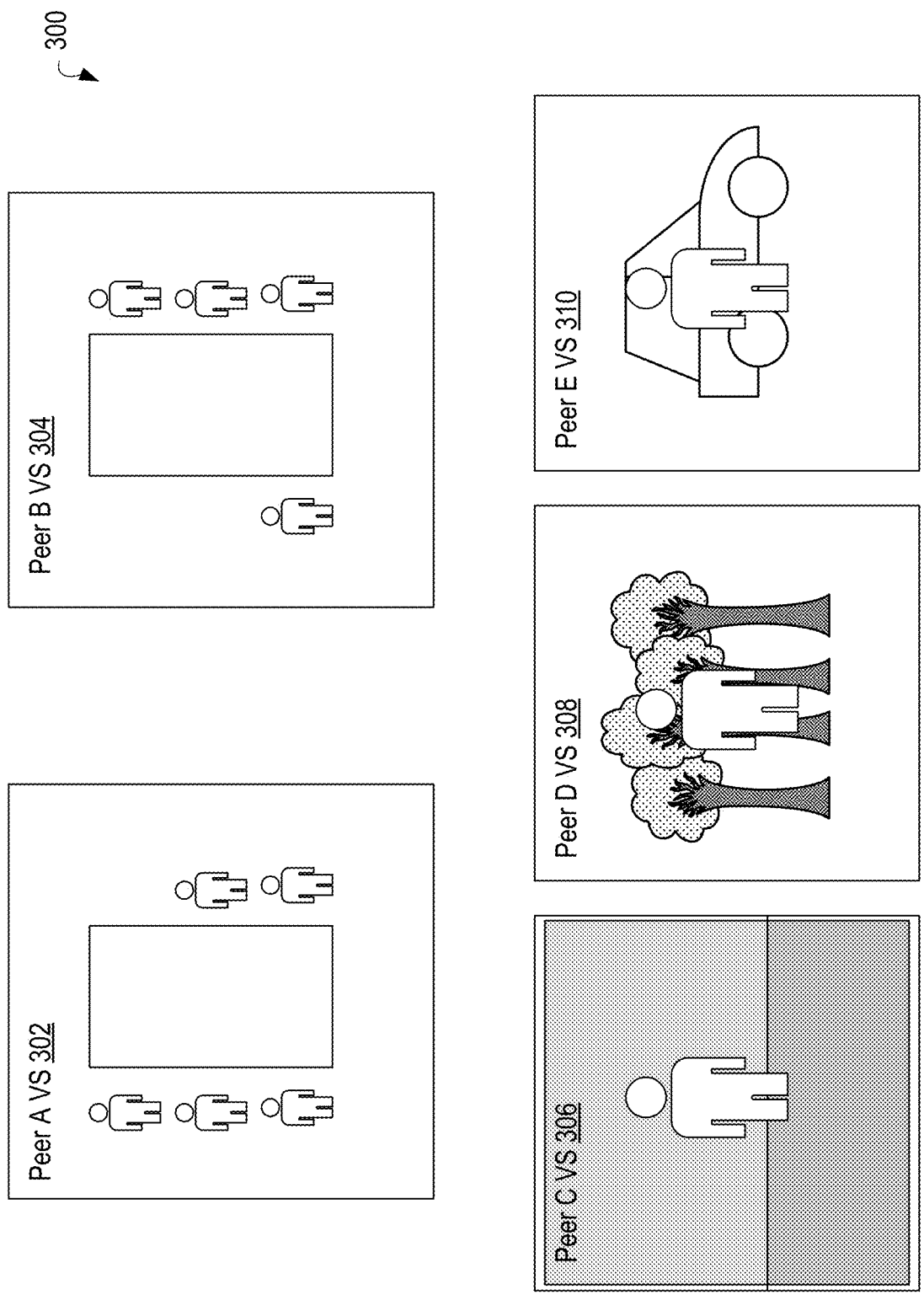
FIGS. 3A-3E illustrates an example scenario for creating and interacting with composite videos, according to an embodiment of the present technology.

FIGS. 3A-3E illustrate an example scenario 300 to create and interact with composite videos based on video streams associated with a plurality of peers involved in a video communication, according to an embodiment of the present technology. In FIG. 3A, the video communication relating to the example scenario 300 involves peer A, peer B, peer C, peer D, and peer E. The example scenario 300 includes a video stream associated with peer A (or peer A video stream (VS) 302, a video stream associated with peer B (or peer B video stream (VS) 304, a video stream associated with peer C (or peer C video stream (VS) 306, a video stream associated with peer D (or peer D video stream (VS) 308, and a video stream associated with peer E (or peer E video stream (VS) 310. The peer A video stream 302 and the peer B video stream 304 are each associated with a peer that constitutes a conference room in which a plurality of users participate in the video communication. Each of the peer C video stream 306, the peer D video stream 308, and the peer E video stream 310 is associated with a location at which a user is positioned while participating in the video communication. With respect to the peer C video stream 306, the peer D video stream 308, and the peer E video stream 310, the location of the user may change through movement of the user as the user participates in the video communication.

Figure 3B:
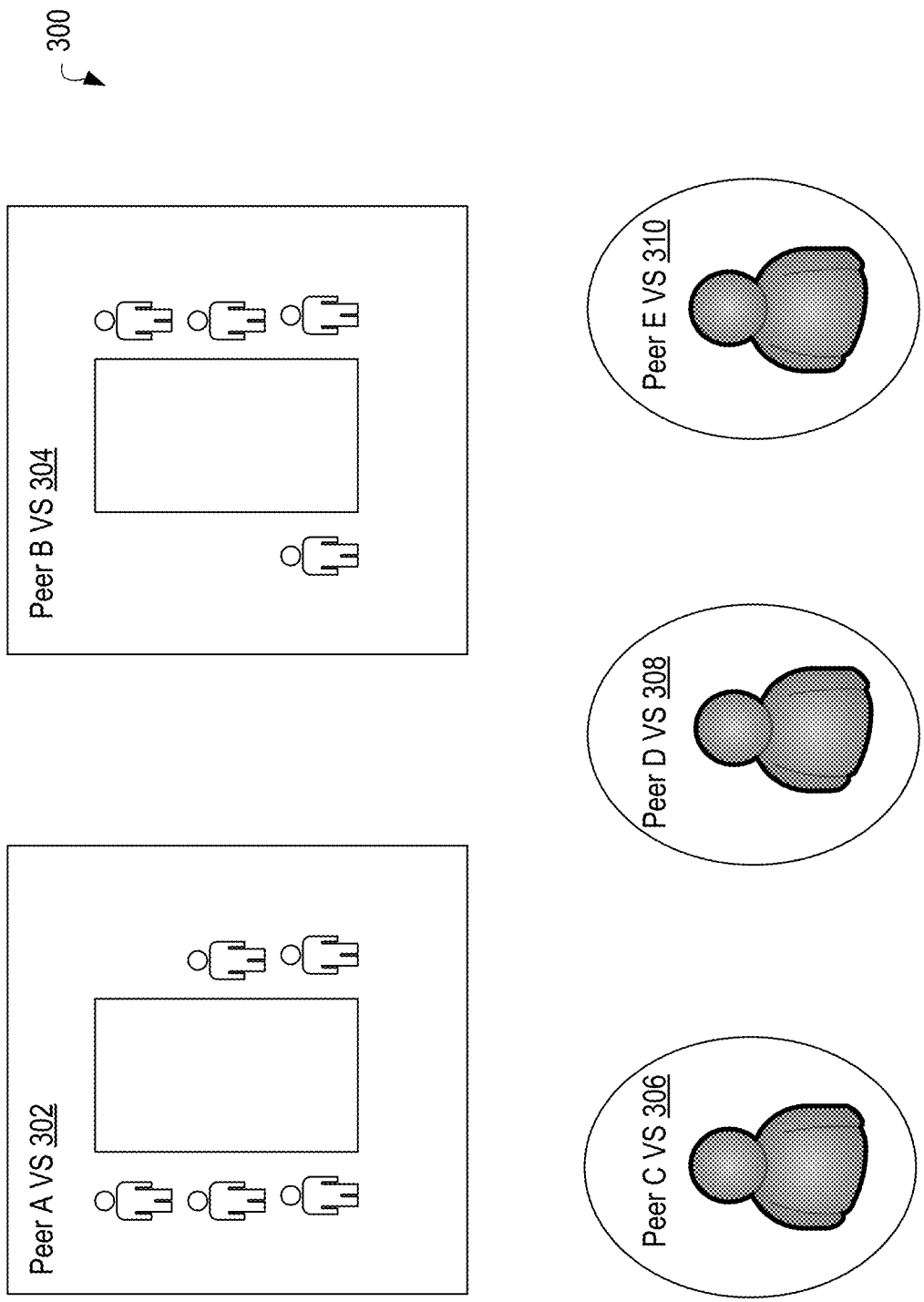

In FIG. 3B, peer A and peer B have been determined to be primary peers because their respective video streams each reflects a threshold number of users that have been identified by video analysis. Peer C, peer D, and peer E have been determined to be secondary peers because each of their respective video streams does not reflect a threshold number of users that have been identified by video analysis. Based on peer C, peer D, and peer E constituting secondary peers, the peer C video stream 306, the peer D video stream 308, and the peer E video stream 310 have been modified. The modification of the peer C video stream 306, the peer D video stream 308, and the peer E video stream 310 has been performed to facilitate creation of a video composite. In the example scenario 300, the original rectangular display shape of the peer C video stream 306, the peer D video stream 308, and the peer E video stream 310 has been modified to have an oval display shape. In addition to a change in display shape, the modification also can involve a selected resizing of the depiction of a user in each of the modified video streams and selected removal of subject matter (e.g., objects, background, foreground) reflected in the video streams that does not depict the user.

Figure 3C:
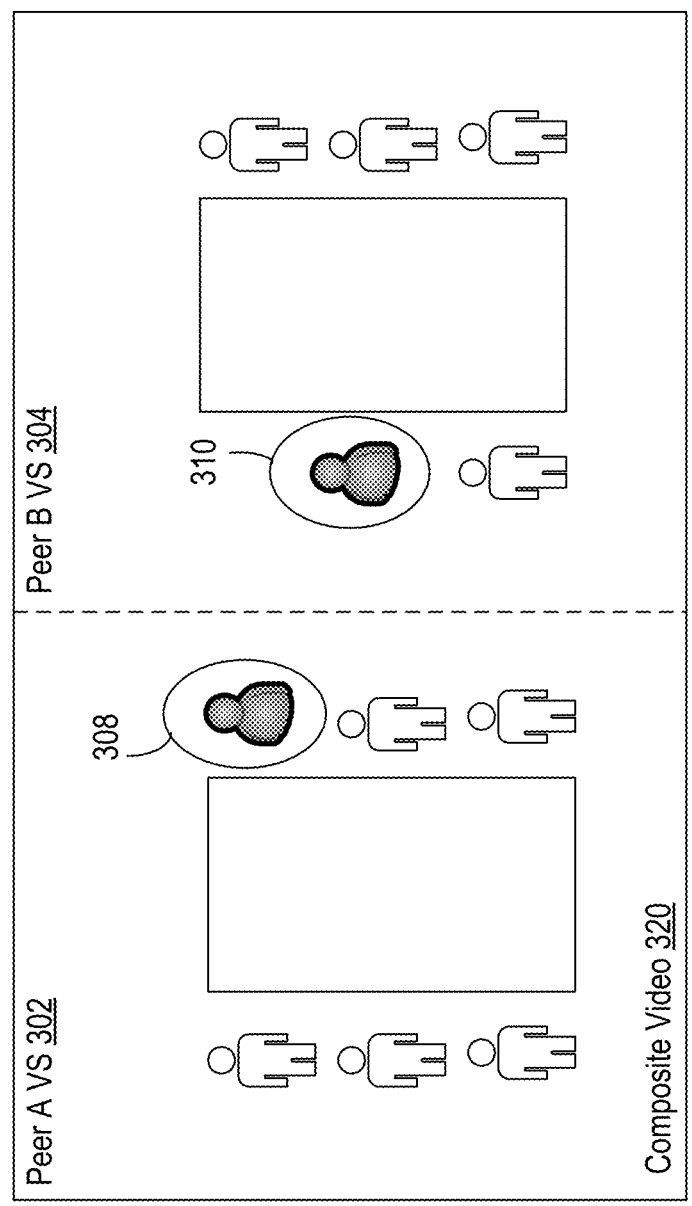

In FIG. 3C, a composite video 320 is created from the peer A video stream 302, the peer B video stream 304, the peer D video stream 308, and the peer E video stream 310. The composite video 320 reflects the inclusion of the peer A video stream 302 and the peer B video stream 304 without modification because peer A and peer B constitute primary peers. In the example scenario 300, the peer C video stream 306 is not included in the video composite 320 because the video composite 320 is tailored for presentation to the users of peer C, a viewing peer. In other example scenarios, a video composite can include the video streams of all peers.

The peer D video stream 308 as modified has been superimposed onto the peer A video stream 302 and the peer E video stream 310 as modified has been superimposed onto the peer B video stream 304. In some embodiments, the peer D video stream 308 has been superimposed onto the peer A video stream 302 based on a presence of a selected static area detected in the peer A video stream 302 where the peer D video stream 308 can be superimposed. The selected static areas can constitute an object or area that does not satisfy a materiality threshold. In some embodiments, the peer D video stream 308 can be superimposed onto the peer A video stream 302 instead of the peer B video stream 304 because the user of peer D has been determined to have a greater affinity with one or more users of peer A in comparison to users of peer B. Similarly, in some embodiments, the peer E video stream 310 has been superimposed onto the peer B video stream 304 based on a presence of a selected static area detected in the peer B video stream 304 where the peer E video stream 310 can be superimposed. The selected static areas can constitute an object or area that does not satisfy a materiality threshold. In some embodiments, the peer E video stream 310 can be superimposed onto the peer B video stream 304 because the user of peer E has been determined to have a greater affinity with one or more users of peer B in comparison to users of peer A.

In other embodiments, the peer D video stream 308 can be superimposed onto the peer A video stream 302 and the peer E video stream 310 can be superimposed onto the peer B video stream 304 in accordance with a rule to create the video composite 320. An example rule can provide for modified video streams of secondary peers to be equally distributed across and superimposed onto the video streams of primary peers. For example, video analysis can identify selected static areas in the peer A video stream 302 and the peer B video stream 304. In this case, the rule can cause the peer D video stream 308 to be superimposed onto the peer A video stream 302 and the peer E video stream 310 to be superimposed onto the peer B video stream 304. The application of the rule can result in the composite video 320. Other rules can result in other video composites.

Figure 3D:
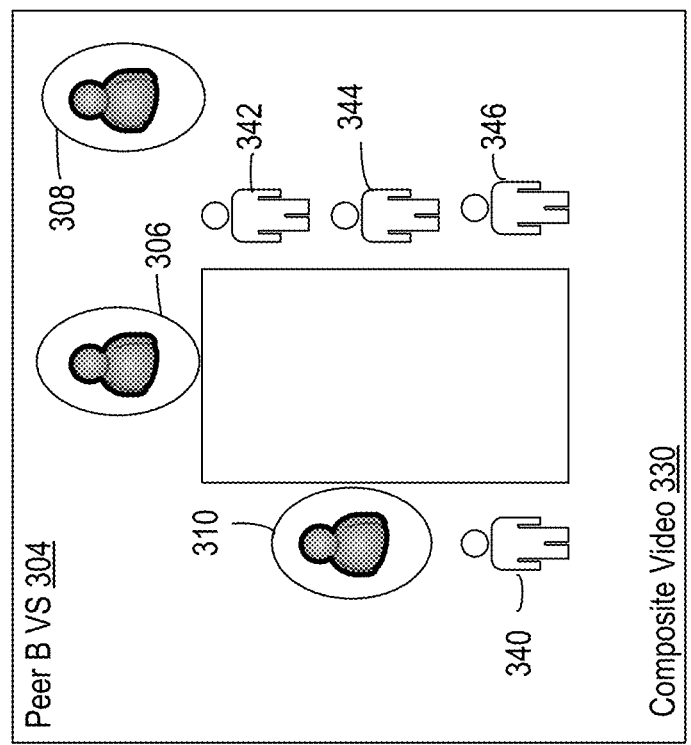

In FIG. 3D, a composite video 330 is created from the peer B video stream 304, the peer C video stream 306, the peer D video stream 308, and the peer E video stream 310. The composite video 330 reflects the inclusion of the peer B video stream 304 without modification because peer B constitutes a primary peer. In the example scenario 300, the peer A video stream 302 is not included in the video composite 330 because the video composite 330 is tailored for presentation to the users of peer A, a viewing peer. In other example scenarios, a video composite can include the video streams of all peers.

The peer C video stream 306 as modified, the peer D video stream 308 as modified, and the peer E video stream as modified have been superimposed onto the peer B video stream 304. In some embodiments, the peer C video stream 306, the peer D video stream 308, and the peer E video stream have been superimposed onto the peer B video stream 304 based on a presence of selected static areas detected in the peer B video stream 304 where the video streams have been superimposed. The static areas can constitute objects or areas reflected in the peer B video stream 304 that do not satisfy a materiality threshold. In some embodiments, the peer E video stream 310 can be superimposed onto the peer B video stream 304 adjacent a user 340 based on a high value of affinity with the user 340 in comparison to other users of peer B. In some embodiments, the peer C video stream 306 and the peer D video stream 308 can be superimposed onto the peer B video stream 304 adjacent a user 342, a user 344 and a user 346 based on a high value of affinity between one or more of the user 342, the user 344, and the user 346 in comparison to the user 340.

Figure 3E:
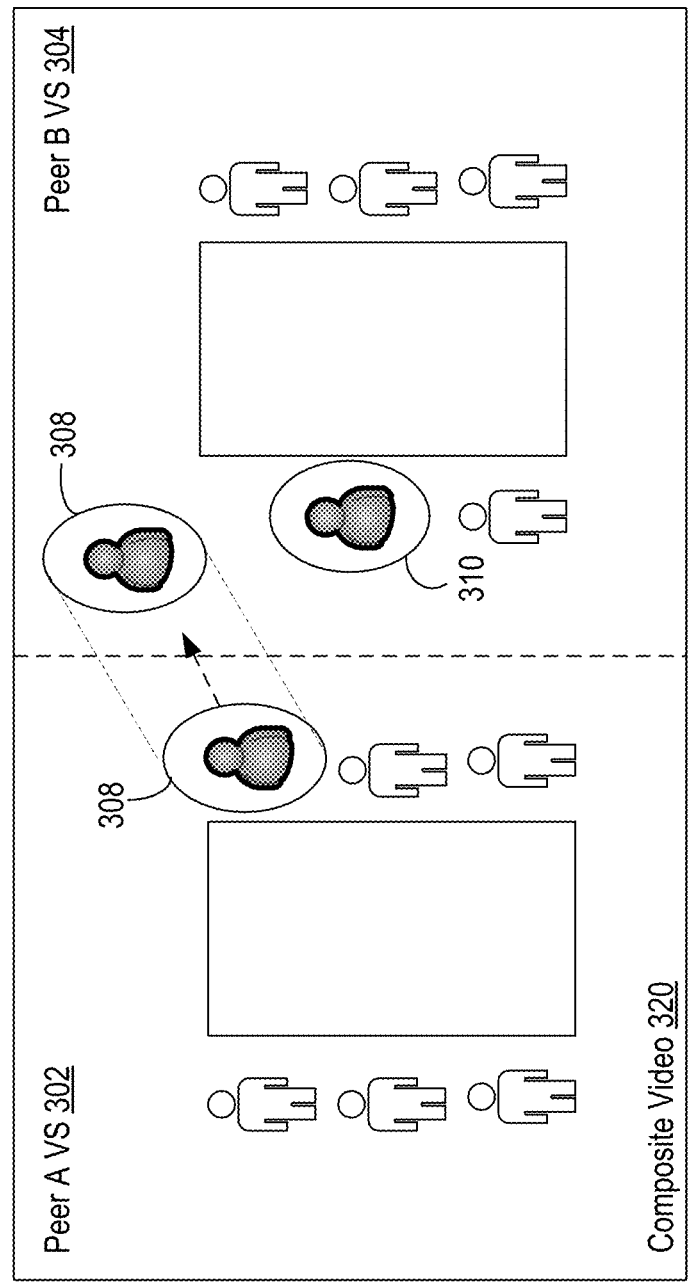

In FIG. 3E, the peer A video stream 302, the peer B video stream 304, the peer D video stream 308, and the peer E video stream 310 in the composite video 320 can be presented to users of peer C, the viewing peer. Through an appropriate user input, such as movement of a cursor or a dragging motion applied to a screen presenting the composite video 320, a user of peer C can change the location of one or more of the peer A video stream 302, the peer B video stream 304, the peer D video stream 308, and the peer E video stream 310. In the illustrated example, a user of peer C can move the peer D video stream 308 from an original location in the video composite 320 to a new location adjacent to the peer E video stream 310. In other example scenarios, video streams can be moved or otherwise manipulated in other manners.

Figure 4:
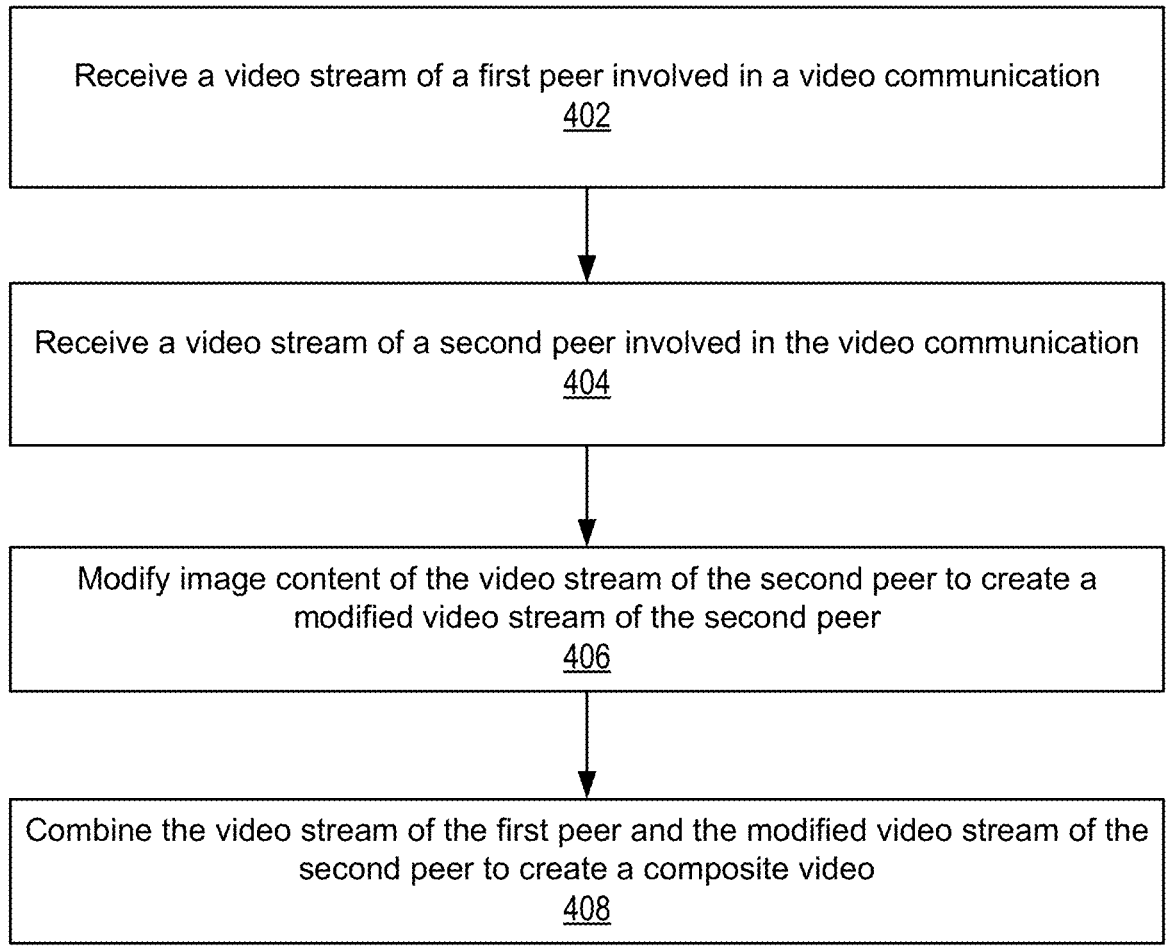
FIG. 4 illustrates a first method for creating a composite video, according to an embodiment of the present technology.

FIG. 4 illustrates a first example method 400 for creating a composite video, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can receive a video stream of a first peer involved in a video communication. At block 404, the method 400 can receive a video stream of a second peer involved in the video communication. At block 406, the method 400 can modify image content of the video stream of the second peer to create a modified video stream of the second peer. At block 408, the method 400 can combine the video stream of the first peer and the modified video stream of the second peer to create a composite video. Other suitable techniques that incorporate various features and embodiments of the present technology are possible.

FIG. 5 illustrates a second example method 500 for creating a composite video, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can determine a first peer involved in a video communication is a primary peer based on satisfaction of a threshold. At block 504, the method 500 can determine a second peer involved in the video communication is a secondary peer based on non-satisfaction of the threshold. At block 506, the method 500 can determine a modified video stream of the second peer is to be superimposed onto a video stream of the first peer to create a composite video. Other suitable techniques that incorporate various features and embodiments of the present technology are possible.

Social Networking System—Example Implementation

Figure 6:
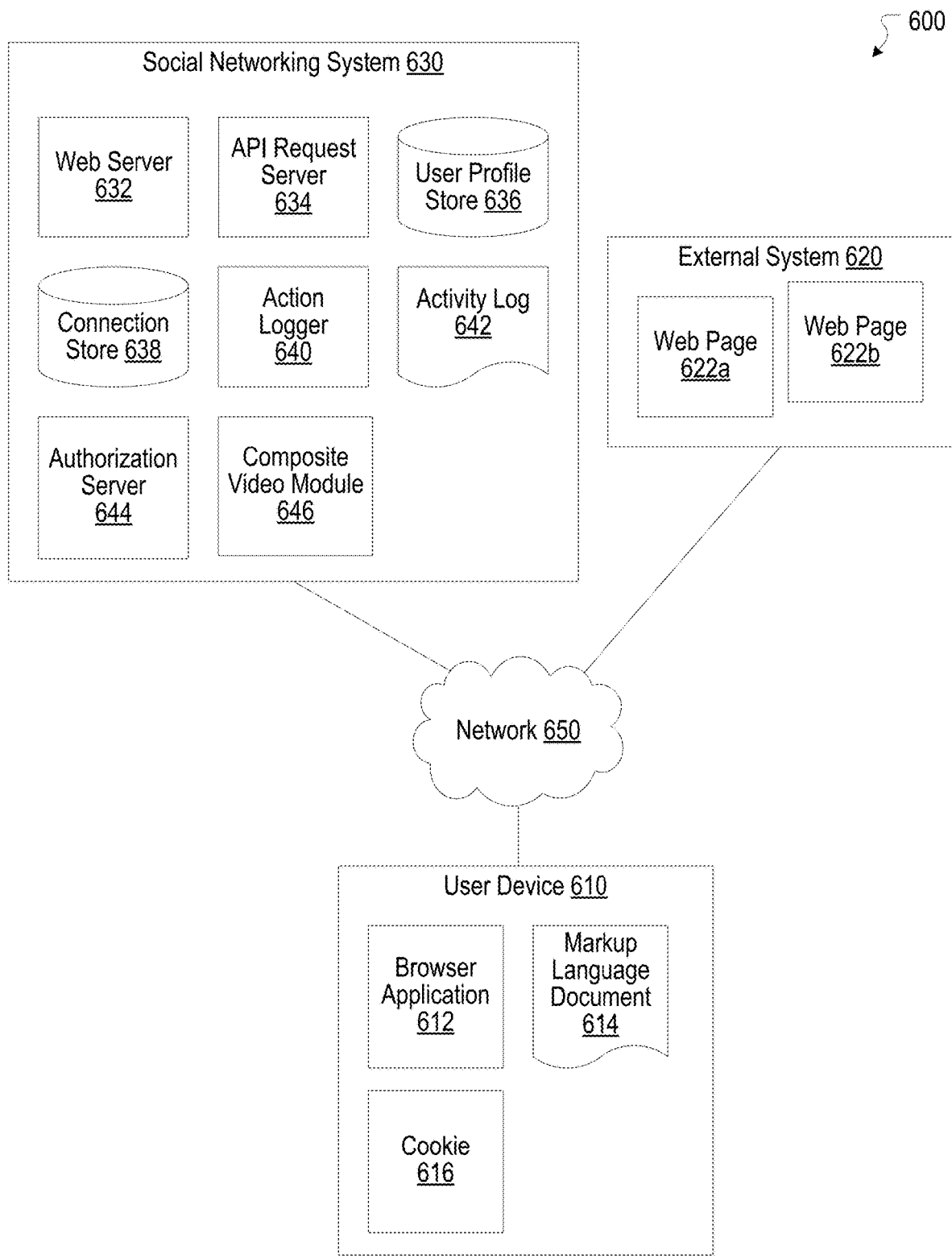
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "oneway." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a composite video module 646. The composite video module 646 can be implemented with the composite video module 102, as discussed in more detail herein. In some embodiments, one or more functionalities of the composite video module 646 can be implemented in the user device 610.

Hardware Implementation

Figure 7:
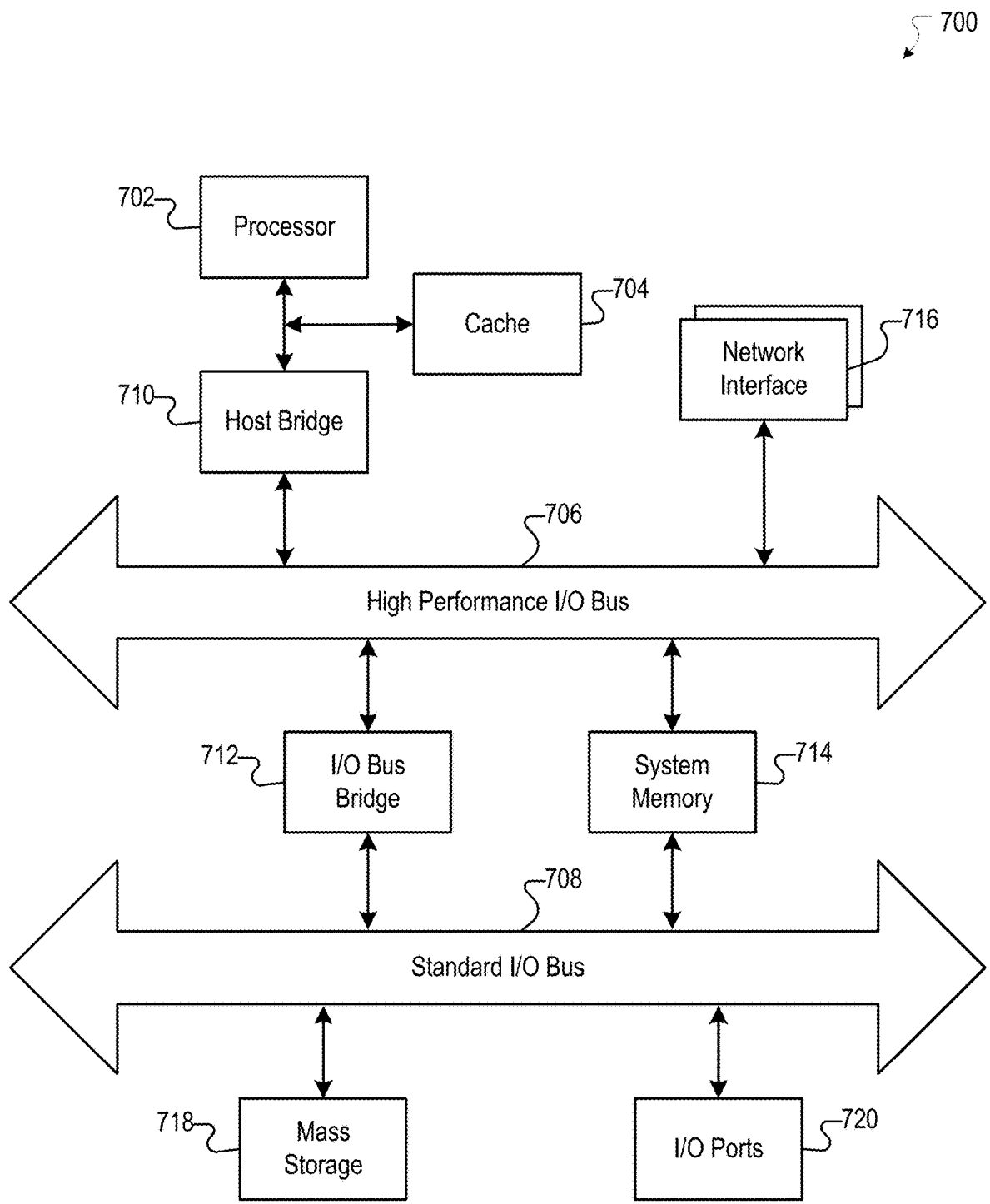
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, that a first peer involved in a video conference is a primary peer;
   determining, by the computing system, that a second peer involved in the video conference is a secondary peer in response to non-satisfaction by the second peer of a threshold associated with a selected number of objects in the second peer;
   determining, by the computing system, a viewing peer involved in the video conference, wherein the primary peer, the secondary peer, and the viewing peer are different;
   creating, by the computing system, a modified video stream of the second peer in response to the determining that the second peer is the secondary peer based on the non-satisfaction by the second peer of the threshold associated with the selected number of objects in the second peer;
   detecting, by the computing system, a static area and a dynamic area in a video stream of the first peer;

superimposing, by the computing system, the modified video stream of the second peer onto the static area in the video stream of the first peer; and providing, by the computing system, a composite video including the video stream of the first peer, the modified video stream of the second peer, and a video stream of the viewing peer for presentation to the viewing peer.

2. The computer-implemented method of claim 1, wherein determination of the primary peer is based on satisfaction of the threshold and determination of the secondary peer is based on non-satisfaction of the threshold.

3. The computer-implemented method of claim 1, wherein the detecting the static area in the video stream of the first peer further comprises:

performing image recognition on the video stream of the first peer; and identifying an area in the video stream of the first peer that does not reflect at least one of motion or change as the static area.

4. The computer-implemented method of claim 1, further comprising:

recognizing objects in a video stream of at least one of the first peer or the second peer.

5. The computer-implemented method of claim 4, further comprising:

determining a probability that at least one object in the video stream is a user;

recognizing the at least one object as a user if the probability satisfies a threshold that reflects a desired confidence level; and determining a number of recognized users in the video stream.

6. The computer-implemented method of claim 5, wherein recognition of the at least one object as a user is based on a classifier trained under a supervised learning technique, the supervised learning technique based on multiple images of users that have been tagged with identifying information.

7. The computer-implemented method of claim 1, wherein the modified video stream of the second peer is superimposed onto the video stream of the first peer based on a determination that a difference in location between the first peer and a single user associated with the second peer satisfies a distance threshold.

8. The computer-implemented method of claim 1, further comprising:

receiving an input by a user associated with the viewing peer to change presentation of the composite video; and changing the presentation of the composite video in response to the input.

9. The method of claim 1, the creating of the modified video stream removes at least some subject matter in a video stream of the second peer.

10. A system comprising:

at least one processor; and a memory storing instructions that, when executed by the at least one processor, cause the system to perform:

determining that a first peer involved in a video conference is a primary peer;

determining that a second peer involved in the video conference is a secondary peer in response to non-satisfaction by the second peer of a threshold associated with a selected number of objects in the second peer;

determining a viewing peer involved in the video conference, wherein the primary peer, the secondary peer, and the viewing peer are different;

creating a modified video stream of the second peer in response to the determining that the second peer is the secondary peer based on the non-satisfaction by the second peer of the threshold associated with the selected number of objects in the second peer;

detecting a static area and a dynamic area in a video stream of the first peer;

superimposing the modified video stream of the second peer onto the static area in the video stream of the first peer; and providing a composite video including the video stream of the first peer, the modified video stream of the second peer, and a video stream of the viewing peer for presentation to the viewing peer.

11. The system of claim 10, wherein determination of the primary peer is based on satisfaction of the threshold and determination of the secondary peer is based on non-satisfaction of the threshold.

12. The system of claim 11, wherein the threshold is a selected number of users associated with a peer.

13. The system of claim 10, wherein the detecting the static area in the video stream of the first peer further comprises:

performing image recognition on the video stream of the first peer; and identifying an area in the video stream of the first peer that does not reflect at least one of motion or change as the static area.

14. The system of claim 10, further comprising:

recognizing objects in a video stream of at least one of the first peer or the second peer.

15. A non-transitory computer-readable storage medium including instructions that, when executed by at least one processor of a computing system, cause the computing system to perform a method comprising:

determining that a first peer involved in a video conference is a primary peer;

determining that a second peer involved in the video conference is a secondary peer in response to non-satisfaction by the second peer of a threshold associated with a selected number of objects in the second peer;

determining a viewing peer involved in the video conference, wherein the primary peer, the secondary peer, and the viewing peer are different;

creating a modified video stream of the second peer in response to the determining that the second peer is the secondary peer based on the non-satisfaction by the second peer of the threshold associated with the selected number of objects in the second peer;

detecting a static area and a dynamic area in a video stream of the first peer;

superimposing the modified video stream of the second peer onto the static area in the video stream of the first peer; and providing a composite video including the video stream of the first peer, the modified video stream of the second peer, and a video stream of the viewing peer for presentation to the viewing peer.

16. The non-transitory computer-readable storage medium of claim 15, wherein determination of the primary peer is based on satisfaction of the threshold and determination of the secondary peer is based on non-satisfaction of the threshold.

17. The non-transitory computer-readable storage medium of claim 16, wherein the threshold is a selected number of users associated with a peer.

18. The non-transitory computer-readable storage medium of claim 15, wherein the detecting the static area in the video stream of the first peer further comprises:
performing image recognition on the video stream of the first peer; and
identifying an area in the video stream of the first peer that does not reflect at least one of motion or change as the static area.

19. The non-transitory computer-readable storage medium of claim 15, further comprising:
recognizing objects in a video stream of at least one of the first peer or the second peer.

* * * * *